United States Patent
Hasegawa et al.

(10) Patent No.: US 12,409,830 B2
(45) Date of Patent: Sep. 9, 2025

(54) TRAVEL CONTROL DEVICE FOR HYBRID VEHICLE

(71) Applicant: MITSUBISHI JIDOSHA KOGYO KABUSHIKI KAISHA, Tokyo (JP)

(72) Inventors: Manabu Hasegawa, Tokyo (JP); Takahiro Oguma, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 18/576,534

(22) PCT Filed: Oct. 8, 2021

(86) PCT No.: PCT/JP2021/037298
§ 371 (c)(1),
(2) Date: Jan. 4, 2024

(87) PCT Pub. No.: WO2023/058214
PCT Pub. Date: Apr. 13, 2023

(65) Prior Publication Data
US 2024/0157931 A1    May 16, 2024

(51) Int. Cl.
*B60W 20/14* (2016.01)
*B60W 10/06* (2006.01)
(Continued)

(52) U.S. Cl.
CPC ............ *B60W 20/14* (2016.01); *B60W 10/06* (2013.01); *B60W 10/08* (2013.01); *B60W 50/14* (2013.01);
(Continued)

(58) Field of Classification Search
CPC ...... B60W 20/14; B60W 10/06; B60W 10/08; B60W 50/14; B60W 2050/146;
(Continued)

(56) References Cited

U.S. PATENT DOCUMENTS

| 9,688,265 B2 | 6/2017 | Ikedaya et al. |
| 2016/0059844 A1 | 3/2016 | Ikedaya et al. |

FOREIGN PATENT DOCUMENTS

JP    6500368 B2    4/2019

OTHER PUBLICATIONS

International Search Report (PCT/ISA/210) issued in PCT/JP2021/037298, dated Nov. 22, 2021.

*Primary Examiner* — Alan D Hutchinson
(74) *Attorney, Agent, or Firm* — Birch, Stewart, Kolasch & Birch, LLP (57) ABSTRACT

A travel control device for a hybrid vehicle includes: an acceleration control part for controlling a traveling motor generator or an engine based on a depression amount of an accelerator pedal; and a regenerative control part for controlling the traveling motor generator with a regenerative control intensity set by an operation part. The acceleration control part includes: an EV priority control portion for prioritizing EV traveling over engine traveling. The regenerative control part includes: a restriction portion for restricting or prohibiting regenerative braking; and a forced regeneration portion for performing regenerative braking on a driving wheel and rotationally driving a power generation motor generator by electricity generated in the traveling motor generator to rotationally drive an engine, if the regenerative braking intensity is increased by the operation part in a state where the restriction portion restricts or prohibits the regenerative braking. The acceleration control part deselects an EV priority mode if the regenerative braking intensity is increased by the operation part in a state where the EV priority mode is selected and acceptance of electricity to the driving battery is restricted.

6 Claims, 7 Drawing Sheets

(51) Int. Cl.
*B60W 10/08* (2006.01)
*B60W 50/14* (2020.01)
(52) U.S. Cl.
CPC ... *B60W 2050/146* (2013.01); *B60W 2510/18* (2013.01); *B60W 2540/10* (2013.01); *B60W 2710/0644* (2013.01); *B60W 2710/081* (2013.01); *B60W 2720/106* (2013.01)
(58) Field of Classification Search
CPC ......... B60W 2510/18; B60W 2540/10; B60W 2710/0644; B60W 2710/081; B60W 2720/106; B60W 50/082; B60W 20/00; B60W 20/40; B60W 30/18127; B60K 1/00; B60K 6/442; B60K 23/00; B60Y 2200/92; B60Y 2300/18125; B60Y 2300/182; Y02T 10/62

See application file for complete search history.

TRAVEL CONTROL DEVICE FOR HYBRID VEHICLE

TECHNICAL FIELD

The present disclosure relates to a travel control device for a hybrid vehicle.

BACKGROUND

Patent Document 1 discloses a travel control device for a hybrid vehicle, which includes: a traveling motor generator configured to power-drive a driving wheel of the vehicle and configured to perform regenerative braking on the driving wheel; a driving battery configured to supply electricity to the traveling motor generator if the traveling motor generator power-drives the driving wheel and configured to recover electricity from the traveling motor generator if the traveling motor generator performs regenerative braking on the driving wheel; a power generation motor generator configured to generate electricity to charge the driving battery; and an engine configured to rotationally drive the power generation motor generator and be rotationally driven by the power generation motor generator. The hybrid vehicle includes an operation part for setting a regenerative braking intensity of the traveling motor generator, whereas the travel control device includes a regenerative control part configured to control the traveling motor generator such that the traveling motor generator performs regenerative braking on the driving wheel with the regenerative control intensity set by the operation part. The regenerative control part includes: a restriction portion configured to control the traveling motor generator such that regenerative braking is restricted or prohibited if the driving battery restricts acceptance of electricity; and a forced regeneration portion configured to control the traveling motor generator such that the traveling motor generator performs regenerative braking on the driving wheel and configured to rotationally drive the power generation motor generator by electricity generated in the traveling motor generator to rotationally drive an engine if the regenerative braking intensity is increased by an control lever in a state where the restriction portion controls the traveling motor generator such that regenerative braking is restricted or prohibited.

Further, the hybrid vehicle is known which includes an EV switch for selecting an EV priority mode, and prioritizes, if the EV priority mode is selected, EV traveling where the rotational drive of the engine is stopped over engine traveling where the engine is rotationally driven.

CITATION LIST

Patent Literature

Patent Document 1: JP6500368B

SUMMARY

Technical Problem

Meanwhile, in a case where the hybrid vehicle disclosed in Patent Document 1 is provided with the EV switch and the EV priority mode is selected, if the regenerative braking intensity is increased by the operation part in a state where the driving battery restricts acceptance of electricity to the driving battery even though EV traveling is prioritized over engine traveling, the engine is rotationally driven by rotationally driving the power generation motor generator with electricity generated in the traveling motor generator. Therefore, it is necessary to deselect the EV priority mode.

The present disclosure has been made in view of the above-described problems, and an object of the present disclosure is to provide a travel control device for a hybrid vehicle capable of deselecting an EV priority mode if a regenerative braking intensity is increased by an operation part in a state where a driving battery restricts acceptance of electricity to the driving battery, even though the EV priority mode is selected.

Solution to Problem

In order to achieve the above object, a travel control device for a hybrid vehicle according to the present disclosure, includes: a traveling motor generator configured to power-driving a driving wheel of the vehicle and configured to perform regenerative braking on the driving wheel: a driving battery configured to supply electricity to the traveling motor generator if the traveling motor generator power-drives the driving wheel and configured to recover electricity from the traveling motor generator if the traveling motor generator performs regenerative braking on the driving wheel; a power generation motor generator configured to generate electricity to charge the driving battery; and an engine configured to rotationally drive the power generation motor generator and be rotationally driven by the power generation motor generator. The hybrid vehicle includes: an EV switch for selecting an EV priority mode; and an operation part for setting a regenerative braking intensity of the traveling motor generator. The travel control device includes: an acceleration control part configured to control rotational drive of the traveling motor generator or rotational drive of the engine such that the driving wheel is power-driven based on a depression amount of an accelerator pedal; and a regenerative control part configured to control the traveling motor generator such that the traveling motor generator performs regenerative braking on the driving wheel with the regenerative control intensity set by the operation part. The acceleration control part includes: an EV priority control portion configured to prioritize EV traveling where the rotational drive of the engine is stopped over engine traveling where the engine is rotationally driven, if the EV priority mode is selected. The regenerative control part includes: a restriction portion configured to control the traveling motor generator such that the regenerative braking is restricted or prohibited, if the driving battery restricts acceptance of electricity to the driving battery; and a forced regeneration portion configured to control the traveling motor generator such that the traveling motor generator performs regenerative braking on the driving wheel and configured to rotationally drive the power generation motor generator by electricity generated in the traveling motor generator to rotationally drive the engine, if the regenerative braking intensity is increased by the operation part in a state where the restriction portion controls the traveling motor generator such that the regenerative braking is restricted or prohibited. The acceleration control part deselects the EV priority mode if the regenerative braking intensity is increased by the operation part in a state where the EV priority mode is selected and the acceptance of electricity to the driving battery is restricted.

Advantageous Effects

With a travel control device for a hybrid vehicle according to the present disclosure, an EV priority mode can be canceled if a regenerative braking intensity is increased by an operation part in a state where a driving battery restricts acceptance of electricity to the driving battery, even though the EV priority mode is selected.

DETAILED DESCRIPTION

A travel control device for a hybrid vehicle according to embodiments will be described below with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention. The hybrid vehicle described here is a plug-in hybrid vehicle (PHEV, PHV), but it is not limited to this and may be a hybrid (HV) vehicle.

Embodiment 1

[Configuration of Hybrid Vehicle 1]

Figure 1:
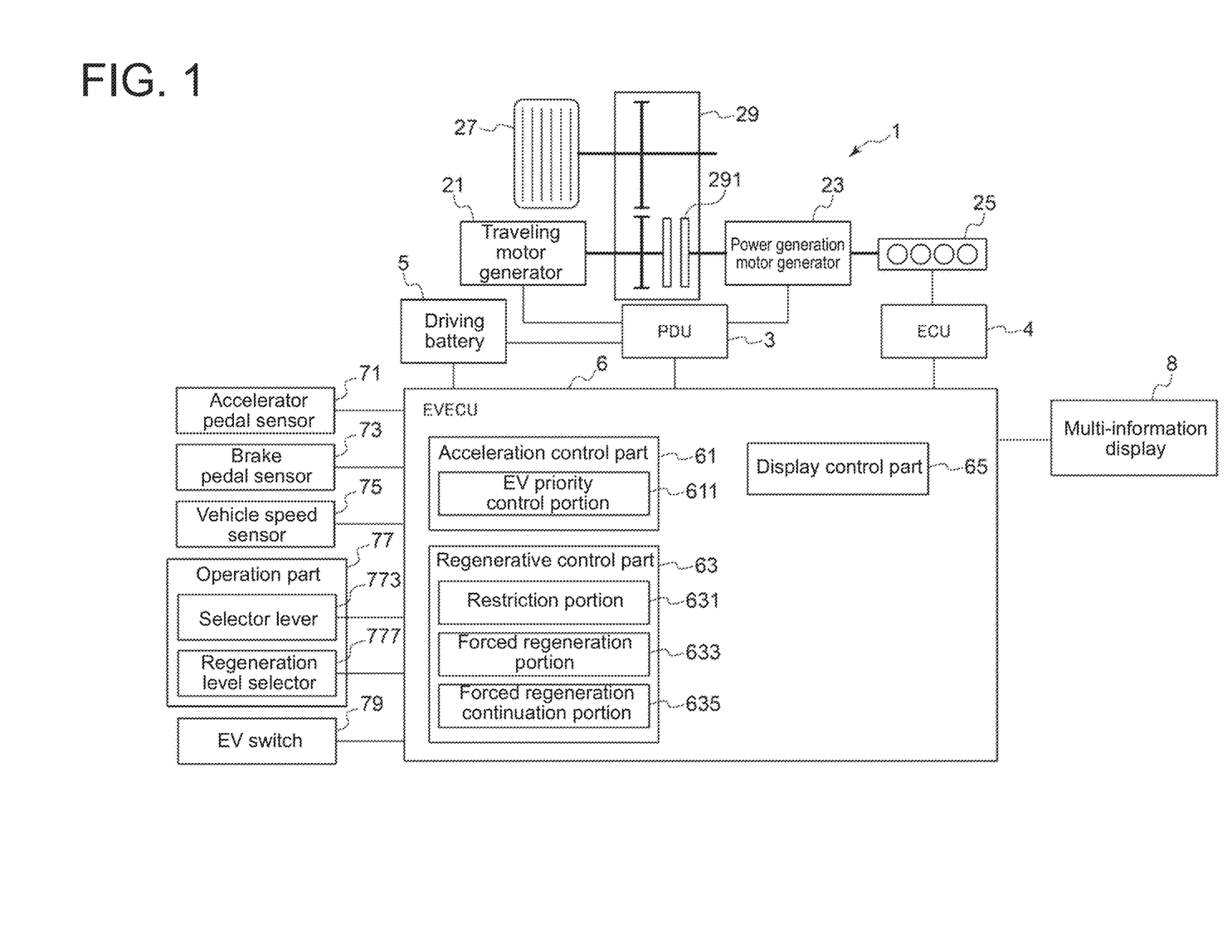
FIG. 1 is a diagram schematically showing the configuration of a hybrid vehicle equipped with a travel control device according to Embodiment 1.

As shown in FIG. 1, a hybrid vehicle 1 of Embodiment 1 is a hybrid vehicle powered by a traveling motor generator 21, a power generation motor generator 23, and an engine 25, and includes a power drive unit (PDU) 3, an engine control unit (ECU) 4, and a driving battery 5, in addition to the traveling motor generator 21, the power generation motor generator 23, and the engine 25.

The traveling motor generator 21 is a motor generator configured to power-drive a driving wheel 27 of the vehicle and configured to perform regenerative braking on the driving wheel 27, and the traveling motor generator 21 is controlled by the power drive unit 3. Electricity is supplied to the traveling motor generator 21 from the driving battery 5 connected to the power drive unit 3 if the driving wheel 27 is power-driven, and electricity (electricity regenerated in the traveling motor generator 21) is recovered from the traveling motor generator 21 to the driving battery 5 via the power drive unit 3 if the driving wheel 27 is subjected to regenerative braking. A transaxle 29 is disposed between the traveling motor generator 21 and the driving wheel 27. The transaxle 29 is a device integrating a transmission, a final gear, and a differential gear. Power of the traveling motor generator 21 is transmitted to the driving wheel 27 via the transaxle 29 during vehicle acceleration, and braking power of the traveling motor generator 21 during vehicle deceleration is transmitted to the driving wheel 27 via the transaxle 29. Whereby, traveling is possible in which the traveling motor generator 21 is rotationally driven in a state where the rotational drive of the engine 25 is stopped. In the following description, "traveling in which the traveling motor generator 21 is rotationally driven in the state where the rotational drive of the engine 25 is stopped" is referred to as "EV traveling" and being in a state of EV traveling is referred to as an "EV traveling mode".

The power generation motor generator 23 is a motor generator configured to generate electricity to charge the driving battery 5, and the power generation motor generator 23 is controlled by the power drive unit 3. Electricity generated by the power generation motor generator 23 is charged to the driving battery 5 connected to the power drive unit 3. In the hybrid vehicle 1 according to embodiment 1, electricity from the driving battery 5 alone may not be sufficient to produce a maximum output if the vehicle accelerates rapidly, so electricity generated by the power generation motor generator 23 is added to electricity from the driving battery 5 and supplied to the traveling motor generator 21. Whereby, traveling while starting the engine 25 and supplying electricity generated by the power generation motor generator 23 to the driving battery 5 or the traveling motor generator 21 is possible, and electricity generated by the power generation motor generator 23 is added to electricity supplied from the driving battery 5 if electricity generated by the power generation motor generator 23 is supplied to the traveling motor generator 21. In the following description, "traveling while starting the engine 25 and supplying electricity generated by the power generation motor generator 23 to the driving battery 5 or the traveling motor generator 21" is referred to as "series traveling" and being in a state of series traveling is referred to as a "series traveling mode".

The engine 25 is an engine configured to rotationally drive the power generation motor generator 23 and be rotationally driven by the power generation motor generator 23, and the engine 25 is controlled by the engine control unit 4. For example, an output shaft (crank shaft) of the engine 25 is connected to an output shaft of the power generation motor generator 23 directly or indirectly via a gear train or the like. Thus, the power generation motor generator 23 is rotationally driven by rotationally driving the engine 25, and conversely, the engine 25 is rotationally driven by rotationally driving the power generation motor generator 23. Consequently, if the power generation motor generator 23 is rotationally driven by electricity generated (regenerated) in the traveling motor generator 21, the engine 25 is also rotationally driven. In this case, the engine 25 becomes a load, and electricity generated (regenerated) in the traveling motor generator 21 is consumed by the power generation motor generator 23.

The engine 25 is, for example, a gasoline engine, but it is not limited to the gasoline engine and may be an internal combustion engine such as a diesel engine. In the hybrid vehicle 1 according to Embodiment 1, the engine 25 is coupled to the power generation motor generator 23 via the above-described transaxle 29, the motor generator is rotationally driven if the engine 25 is subjected to a combustion operation, and the engine 25 is rotationally driven if the power generation motor generator 23 is rotationally driven. In the hybrid vehicle 1 according to Embodiment 1, a clutch 291 is disposed in the transaxle 29, and the power of the engine 25 is transmitted to the driving wheel 27 via the transaxle 29 by connecting the clutch 291. Whereby, traveling while transmitting the power of the engine 25 to the driving wheel 27 is possible by starting the engine 25 as well as connecting the clutch 291, and the power of the engine 25 is added to the power of the traveling motor generator 21. In the following description, "traveling while transmitting the power of the engine 25 to the driving wheel 27, by starting the engine 25 as well as connecting the clutch 291" is referred to as "parallel traveling" and being in a state of parallel traveling is referred to as a "parallel traveling mode". Electricity generated by the power generation motor generator 23 in parallel traveling is charged to the driving battery 5 connected to the power drive unit 3.

Figure 2:
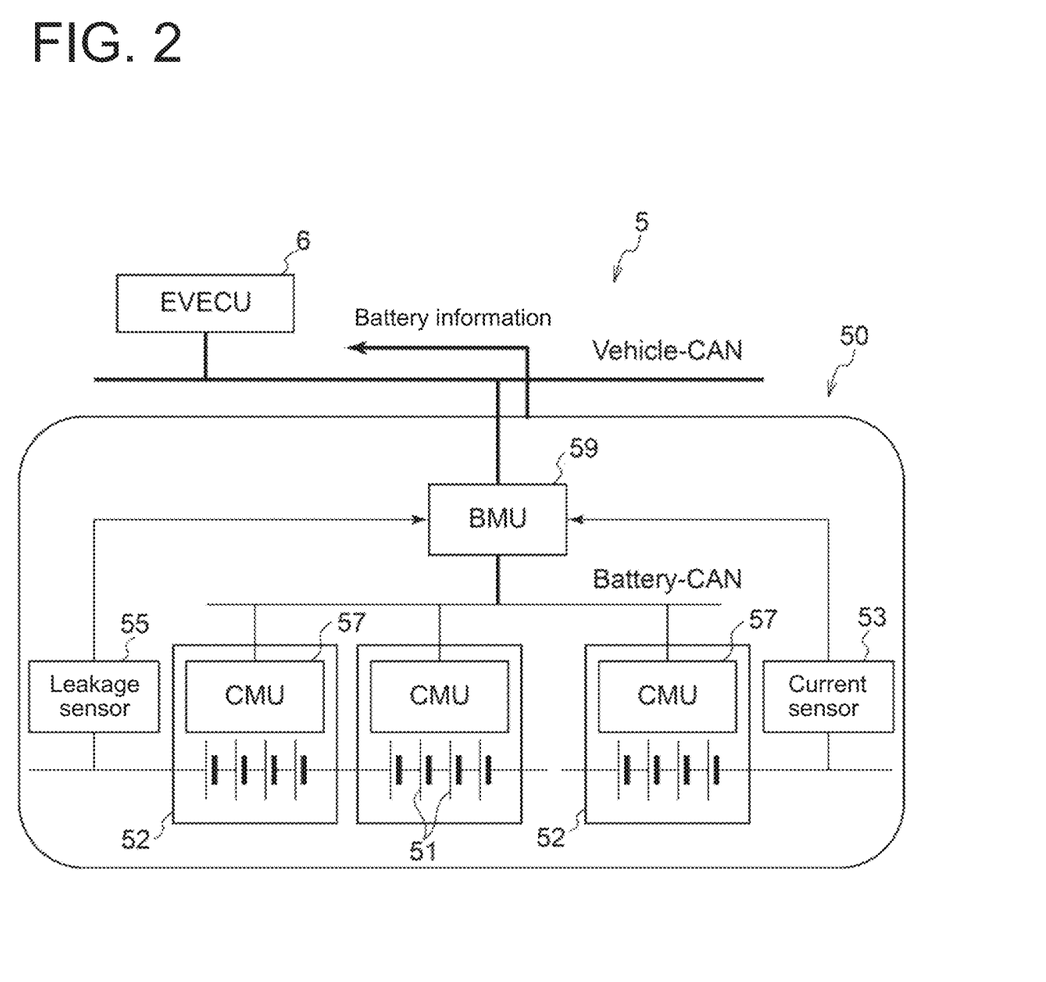
FIG. 2 is a diagram schematically showing the configuration of a driving battery shown in FIG. 1.

As shown in FIG. 2, the driving battery 5 is formed by a battery pack 50 in which a plurality of (many) battery cells 51 are housed in a single container. The battery cells 51 housed in the battery pack 50 are grouped into several groups, and the plurality of battery cells 51 included in the group form one battery module 52. The driving battery 5 thus configured is provided with a current sensor 53, a leakage sensor 55, a cell monitor unit (CMU) 57, and a battery management unit (BMU) 59. The current sensor 53, the leakage sensor 55, and the cell monitor unit 57 can manage (monitor) a voltage and a temperature of the battery cells 51 included in the group. The battery management unit 59 can manage the battery module 52 and can individually manage all the battery cells 51 through the cell monitor unit 57 incorporated in each group. Whereby, the battery management unit 59 can monitor the voltage and the temperature of each battery cell 51, in addition to being able to estimate the capacity and state of charge (SOC) of the battery pack 50, and can determine whether electricity can be accepted to the driving battery 5, in addition to being able to diagnose a failure. Thus, the battery management unit 59 constitutes a determination part for determining whether the acceptance of electricity to the driving battery 5 is restricted.

Whether electricity can be accepted to the driving battery 5 is determined, for example, by determining full charge, a high battery temperature, and a low battery temperature. The full charge is determined by estimating the capacity and state of charge of the battery pack 50, and it is determined that the battery is fully charged if predetermined state of charge (threshold) is exceeded. The high battery temperature is determined by the temperature of the battery cell 51 having the highest temperature (highest cell temperature) among the plurality of battery cells 51, and it is determined that the battery is hot if the highest cell temperature exceeds a predetermined temperature (threshold). The low battery temperature is determined by the temperature of the battery cell 51 having the lowest temperature (lowest cell temperature) among the plurality of battery cells 51, and it is determined that the battery is cold if the lowest cell temperature is less than a predetermined temperature (threshold). Then, if it is determined that the battery is either of fully charged, hot, or cold, the battery management unit 59 restricts the acceptance of electricity to the driving battery 5. On the other hand, if all the determinations that the battery is fully charged, hot, or cold are resolved in the state where the acceptance of electricity to the driving battery 5 is restricted, the restriction on accepting electricity to the driving battery 5 is lifted. Restricting the acceptance of the driving battery 5 to electricity includes a case where the amount of electricity accepted to the driving battery 5 is restricted, besides a case where the acceptance of electricity to the driving battery 5 is prohibited.

The hybrid vehicle 1 according to Embodiment 1 described above is controlled by a travel control device (EVECU) 6. The travel control device 6 is composed of, for example, an input/output interface (not shown), besides a processor (not shown) composed of a computing device, a register for storing an instruction or information, a peripheral circuit, etc., and a memory (not shown) such as ROM (Read Only Memory) or RAM (Random Access Memory).

The travel control device 6 is connected to an accelerator pedal sensor 71, a brake pedal sensor 73, a vehicle speed sensor 75, and an operation part 77.

The accelerator pedal sensor 71 is a sensor for detecting a depression amount of an accelerator pedal, and the brake pedal sensor 73 is a sensor for detecting a depression amount of a brake pedal. The vehicle speed sensor 75 is a sensor for detecting a vehicle speed. The vehicle speed sensor 75 is constituted by, for example, a wheel speed sensor, and the vehicle speed is obtained by converting a wheel speed detected by the wheel speed sensor.

Figure 3:
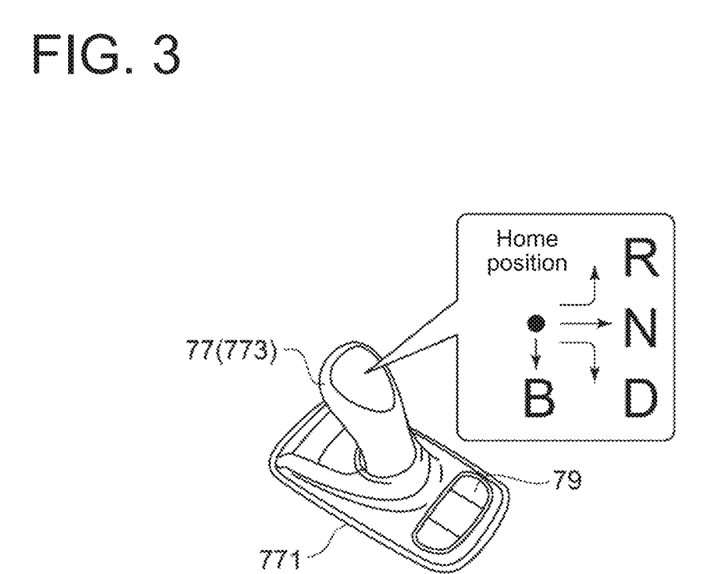
FIG. 3 is a view schematically showing a shift lever shown in FIG. 1.
Figure 4:
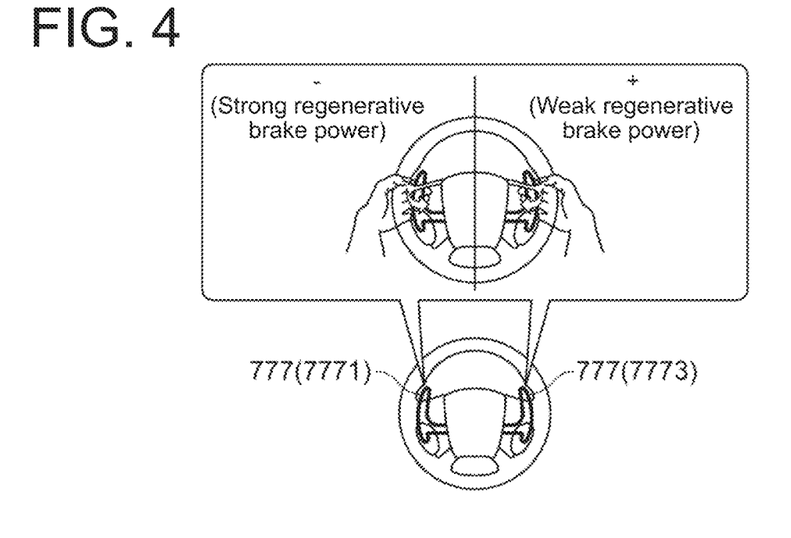
FIG. 4 is a view schematically showing a paddle switch shown in FIG. 1.

The operation part 77 is a part for setting a regenerative braking intensity of the traveling motor generator 21. As shown in FIGS. 3 and 4, the operation part 77 according to Embodiment 1 is composed of a selector lever 773 disposed on a center console 771 and a regeneration level selector 777 disposed in the vicinity of a steering wheel 775, but the operation part 77 is not limited to this, and may be composed of, for example, various operation devices such as an operation lever or an operation button that can be operated by a user seated in a driver's seat.

Figure 5:
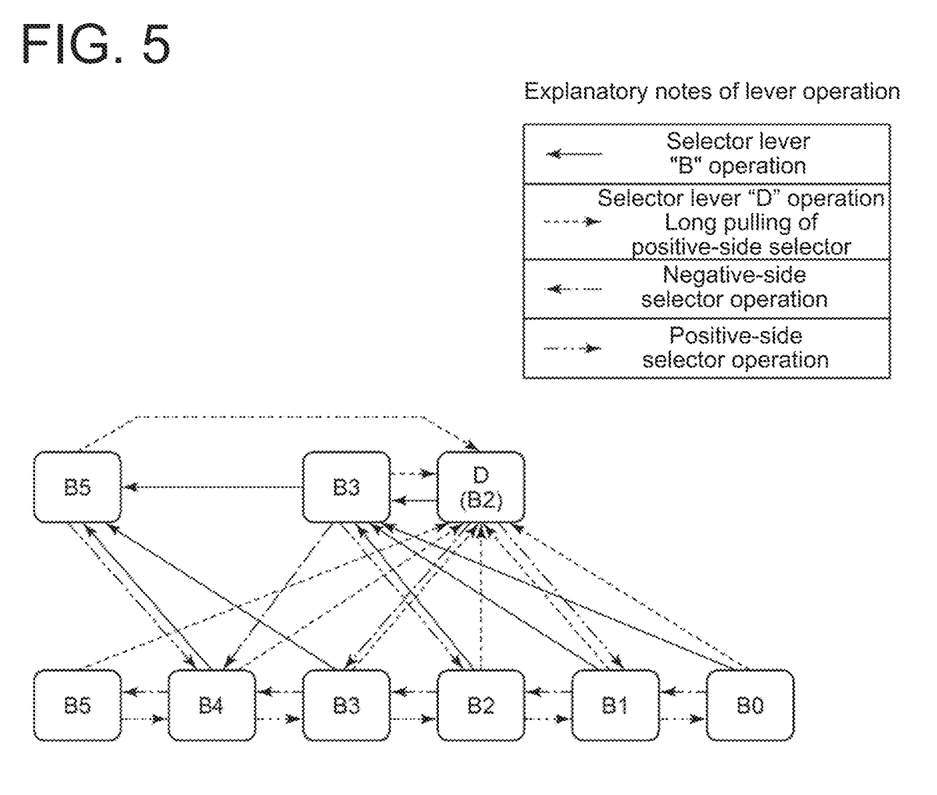
FIG. 5 is a diagram for describing a relationship between a shift position and an operation of the shift lever or the paddle switch.

The selector lever 773 and the regeneration level selector 777 are operation devices for Changing shift positions, and are configured such that a regeneration level is set for each shift position. The regeneration level is set in association with the regenerative braking intensity, and the regenerative braking intensity is changed by changing the regeneration level. As shown in FIG. 5, shift positions that can be set by the selector lever 773 and the regeneration level selector 777 are six shift positions of, for example, from B0 (regenerative braking intensity: low) to B5 (regenerative braking intensity: high).

As shown in FIG. 3, the selector lever 773 is of a joystick type and can be operated to respective positions of R (reverse), N (neutral), D (drive), and B (regenerative brake) from a home position, and the basic shift position D (B2) is selected by operating the selector lever 773 to D. Further, a shift position "B3" with one step higher regenerative braking intensity is selected by operating the selector lever 773 to B once, and a shift position "B5" with maximum regenerative braking intensity is selected by operating the selector lever 773 to B again. Thus, the regenerative braking intensity is increased by operating the selector lever 773 to B once, and the regenerative braking intensity is decreased by operating the selector lever 773 to D.

As shown in FIG. 4, the regeneration level selector 777 is of a paddle type, and is formed by a negative-side selector 7771 and a positive-side selector 7773. The negative-side selector 7771 is used to displace to a shift position with one step higher regenerative braking intensity, and each operation of the negative-side selector 7771 displaces to a shift position with one step higher regenerative braking intensity. The positive-side selector 7773 is used to displace to a shift position with one step lower regenerative braking intensity, and each operation of the positive-side selector 7773 displaces to a shift position with one step lower regenerative braking intensity. Thus, the regenerative braking intensity is increased by operating the negative-side selector 7771, and the regenerative braking intensity is decreased by operating the positive-side selector 7773.

As shown in FIG. 1, the travel control device 6 according to Embodiment 1 described above is connected to an EV switch 79 for selecting an EV priority mode. As shown in FIG. 3, tier example, the EV switch 79 is constituted by a push switch disposed on the center console 771, the priority mode is selected by pressing the EV switch 79 once if the EV priority mode is not selected, and the EV priority mode is canceled by pressing the EV switch 79 once if the EV priority mode is selected.

Figure 6:
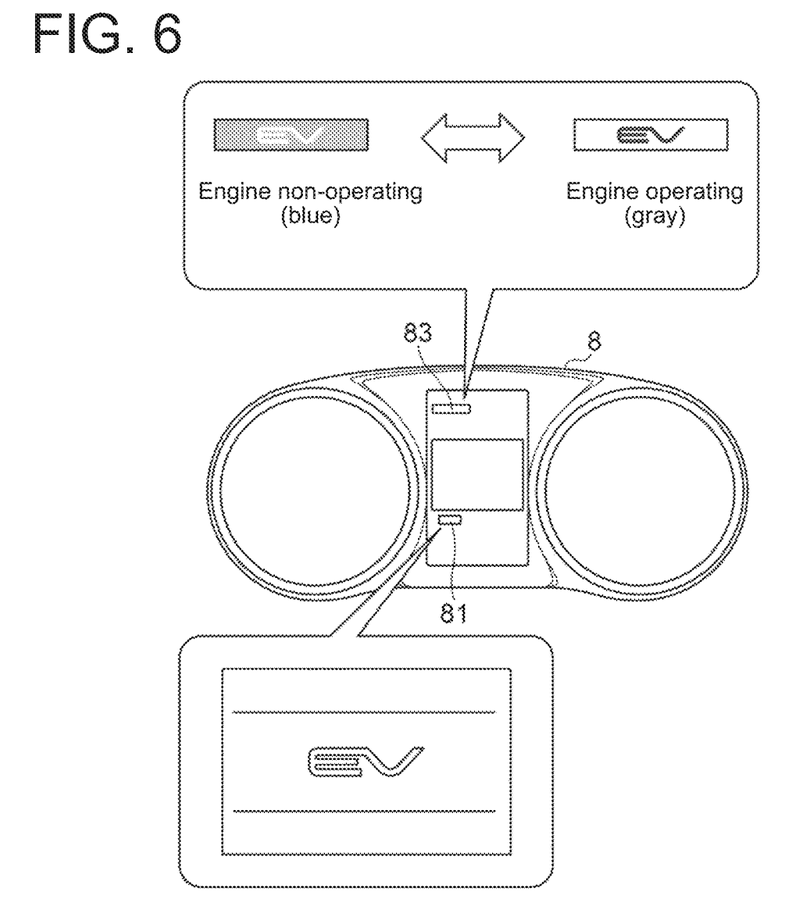
FIG. 6 is a view schematically showing a multi-information display.

As shown in FIG. 1, the travel control device 6 according to Embodiment 1 described above is connected to a multi-information display 8 for displaying various information. As shown in FIG. 6, the multi-information display 8 is provided with a display area 81 (indicator) for displaying that the EV priority mode is selected and a display area 83 displaying an operating state/non-operating state of the engine 25.

[Configuration of Travel Control Device 6 for Hybrid Vehicle 1]

As shown in FIG. 1, the travel control device 6 for the hybrid vehicle 1 according to Embodiment 1 described above is provided with an acceleration control part 61 and a regenerative control part 63. The acceleration control part 61 and the regenerative control part 63 are configured by causing the above-described processor to execute a control program stored in the memory. The acceleration control part 61 and the regenerative control part 63 control the traveling motor generator 21 and the power generation motor generator 23 via the power drive unit 3, as well as control the engine 25 via the engine control unit 4.

The acceleration control part 61 controls the rotational drive of the traveling motor generator 21 via the power drive unit 3 as well as controls the rotational drive of the engine 25 via the engine control unit 4 such that the driving wheel 27 is power-driven based on the depression amount of the accelerator pedal detected by the accelerator pedal sensor 71.

For example, if the traveling motor generator 21 can output driving power necessary for the vehicle to travel with the electricity supplied from the driving battery 5, the power drive unit 3 is controlled such that the traveling motor generator power-drives the driving wheel 27 of the vehicle in a state where the operation of the engine 25 is stopped. Whereby, the vehicle implements EV traveling.

Further, for example, if the traveling motor generator 21 cannot output driving power necessary for the vehicle to travel (accelerate) with the electricity supplied from the driving battery 5, such as in the case of rapid acceleration, and if the traveling motor generator 21 can output driving power necessary for the vehicle to travel (accelerate) by adding the electricity from the power generation motor generator 23, the engine control unit 4 is controlled such that the engine 25 is started and the power drive unit 3 is controlled such that the power generation motor generator 23 generates electricity. The electricity generated by the power generation motor generator 23 is added to the electricity from the driving battery 5 and supplied to the traveling motor generator 21. Further, for example, if the remaining battery capacity of the driving battery 5 is low, the engine control unit 4 is controlled such that the engine 25 is started and the power drive unit 3 is controlled such that the power generation motor generator 23 generates electricity. Electricity generated by the power generation motor generator 23 is charged to the driving battery 5 connected to the power drive unit 3. Whereby, the vehicle implements series traveling.

Further, for example, if the traveling motor generator 21 cannot output driving power necessary for the vehicle to travel (high speed travel) just by adding electricity from the power generation motor generator 23 to electricity supplied from the driving battery 5, such as in a case of where the vehicle travels at high speed, the engine control unit 4 is controlled such that the engine 25 is started and the engine 25 power-drives the driving wheel 27 of the vehicle. Then, if the vehicle accelerates, the driving power from the traveling motor generator 21 is added to the driving power of the engine 25. Whereby, the vehicle implements parallel traveling.

The acceleration control part 61 according to Embodiment 1 includes an EV priority control portion 611. The EV priority control portion 611 prioritizes EV traveling where the rotational drive of the engine 25 is stopped over engine traveling where the engine 25 is rotationally driven, if the EV priority mode is selected by the EV switch 79 and the EV priority control portion 611 selects the EV priority mode. Engine traveling according to Embodiment 1 is series traveling and parallel traveling described above, and the EV priority control portion 611 prioritizes EV traveling over series traveling and parallel traveling if the EV priority mode is selected by the EV switch 79. For example, if the EV priority mode is selected, the EV priority control portion 611 increases the threshold of the depression amount of the accelerator pedal to switch from the EV traveling mode to the series traveling mode compared to that in a normal mode (if the EV priority mode is not selected). Further, for example, if the EV priority mode is selected, the EV priority control portion 611 decreases the threshold of the remaining battery capacity of the driving battery 5 to switch from EV traveling to series traveling compared to that in the normal mode (if the EV priority mode is not selected). Furthermore, for example, if the EV priority mode is selected, the EV priority control portion 611 increases the threshold of the vehicle speed to switch from the EV traveling mode to the parallel traveling mode compared to that in the normal mode (if the EV priority mode is not selected).

The above-described acceleration control part 61 switches from EV traveling to series traveling if the remaining battery capacity of the driving battery 5 falls below the threshold, if the temperature of the driving battery 5 extremely decreases, etc., and the acceleration control part 61 deselects the EV priority mode.

The regenerative control part 63 controls the power drive unit 3 such that the traveling motor generator 21 performs regenerative braking on the driving wheel 27 at the regeneration level (regenerative braking intensity) set by the operation part 77. For example, if the shift position is "D", the regenerative control part 63 controls the power drive unit 3 such that the traveling motor generator 21 performs regenerative braking at the regenerative braking intensity "B2" when a foot is released from the accelerator pedal.

The regenerative control part 63 includes a restriction portion 631, a forced regeneration portion 633, and a forced regeneration continuation portion 635.

The restriction portion 631 controls the power drive unit 3 such that the traveling motor generator 21 restricts or prohibits regenerative braking if the driving battery 5 (battery management unit 59) restricts the acceptance of electricity to the driving battery 5. Electricity generated in the traveling motor generator 21 is also restricted if the power drive unit 3 is controlled such that the traveling motor generator 21 restricts regenerative braking, and electricity generated in the traveling motor generator 21 is accepted to the driving battery 5 even if the acceptance of electricity to the driving battery 5 is restricted. No electricity is generated in the traveling motor generator 21 and no electricity is supplied to the driving battery 5 if the power drive unit 3 is controlled such that the traveling motor generator 21 prohibits regenerative braking.

On the other hand, the restriction portion 631 lifts the restriction or prohibition of regenerative braking if the restriction on accepting electricity to the driving battery 5 is lifted in the state where the power drive unit 3 is controlled such that the traveling motor generator 21 restricts or prohibits regenerative braking. Whereby, the regenerative control part 63 controls the power drive unit 3 such that the traveling motor generator 21 performs regenerative braking on the driving wheel 27 at the regenerative braking intensity set by the operation part 77, if the foot is released from the accelerator pedal.

The forced regeneration portion 633 controls the power drive unit 3 such that the traveling motor generator 21 performs regenerative braking on the driving wheel 27 and controls the power drive unit 3 such that the power generation motor generator 23 is rotationally driven by electricity generated (regen rat-d) in the traveling motor generator 21 to rotationally drive the engine 25, if the regenerative braking intensity is increased by the operation part 77 in the state where the power drive unit 3 is controlled such that the restriction portion 631 restricts or prohibits the regenerative braking of the traveling motor generator 21. Controlling the power drive unit 3 such that the traveling motor generator 21 performs regenerative braking on the driving wheel 27 and controlling the power drive unit 3 such that the power generation motor generator 23 is rotationally driven by electricity generated in the traveling motor generator 21 to rotationally drive the engine 25 are referred to as "motoring control" in the following description. The motoring control is a control to consume electricity generated in the traveling motor generator 21, and performing the motoring control makes it possible to control the power drive unit 3 such that the traveling motor generator 21 performs regenerative braking on the driving wheel 27 at the regenerative braking intensity set by the operation part 77 without collecting electricity to the driving battery 5. Meanwhile, the forced regeneration portion 633 discontinues the motoring control if the regenerative braking intensity is decreased by the operation part 77 in the state where the motoring control is performed.

In the motoring control, the power generation motor generator 23 is rotationally driven by electricity generated in the traveling motor generator 21, and the engine 25 may be subjected to the combustion operation simultaneously via the engine control unit 4. The combustion operation of the engine 25 performed simultaneously with the motoring control is controlled by the engine control unit 4 in terms of a fuel injection amount, a fuel injection timing, an air intake amount, and an ignition timing.

The above-described acceleration control part 61 deselects the EV priority mode if the regenerative braking intensity is increased by the operation part 77 in the state where the EV priority mode is selected and the acceptance of electricity to the driving battery 5 is restricted.

Further, the above-described forced regeneration portion 633 transmits a cancellation notice of the EV priority mode to the acceleration control part 61 if the regenerative braking intensity is increased by the operation part 77. Meanwhile, the acceleration control part 61 disables the selection of the EV priority mode from when the cancellation notice of the EV priority mode is received to when the driving battery 5 lifts the restriction on accepting electricity to the driving battery 5.

The forced regeneration continuation portion 635 continues the motoring control if the restriction on accepting electricity to the driving battery 5 is lifted in the state where the forced regeneration portion 633 performs the motoring control and during vehicle deceleration. Meanwhile, the forced regeneration continuation portion 635 discontinues the motoring control if the restriction on accepting electricity to the driving battery 5 is lifted in the state where forced regeneration motoring control is performed and other than during vehicle deceleration (for example, during acceleration). Whereby, the regenerative control part 63 controls the power drive unit 3 such that the traveling motor generator 21 performs regenerative braking on the driving wheel 27 at the regenerative braking intensity set by the operation part 77, if engine noise is cut off and the foot is released from the accelerator pedal.

The travel control device 6 for the hybrid vehicle 1 according to Embodiment 1 described above further includes a display control part 65. The display control part 65 is a part for controlling display of the multi-information display 8. For example, the display control part 65 displays that the EV priority mode is selected in the display area 81 of the multi-information display 8 for displaying that the EV priority mode is selected, if the EV priority mode is selected by the acceleration control part 61. Further, for example, the display control part 65 displays that the engine 25 is in the operating state in the display area 83 of the multi-information display 8 for displaying the operating state/non-operating state of the engine 25, if the engine 25 is operated, and the display control part 65 displays that the engine 25 is in the non-operating state in the display area 83 of the multi-information display 8 for displaying the operating state/non-operating state of the engine 25, if the engine 25 is stopped.

Further, for example, the display control part 65 displays that the EV priority mode is unselectable on the multi-information display 8, if the acceleration control part 61 disables the selection of the EV priority mode. The display that the EV priority mode is unselectable may be, for example, a text display on the multi-information display 8, or the display that the EV priority mode is unselectable may be illuminated.

With the travel control device 6 for the hybrid vehicle 1 according to Embodiment 1 described above, the display control part 65 displays that the EV priority mode is selected in the display area 81 of the multi-information display 8 for displaying that the EV priority mode is selected, if the EV priority mode is selected by the acceleration control part 61. Therefore, a user driving the hybrid vehicle 1 can know whether the EV priority mode is selected. Further, for example, the display control part 65 displays that the engine 25 is in the operating state in the display area 83 of the multi-information display 8 for displaying the operating state/non-operating state of the engine 25, if the engine 25 is operated, and the display control part 65 displays that the engine 25 is in the non-operating state in the display area 83 of the multi-information display 8 for displaying the operating state/non-operating state of the engine 25, if the engine 25 is stopped. Therefore, the user driving the hybrid vehicle 1 can know whether the engine 25 is in the operating state or in the non-operating state.

Further, for example, the display control part 65 may display that the EV priority mode is unselectable, if the EV switch 79 is operated, from when the cancellation notice of the EV priority mode is received to when the driving battery 5 lifts the restriction on accepting electricity to the driving battery 5. Whereby, the user driving the hybrid vehicle 1 can know that the EV priority mode is unelectable from when the EV priority mode is canceled to when the driving battery 5 lifts the restriction on accepting electricity to the driving battery 5.

[Contents of Travel Control of Hybrid Vehicle 1]

Figure 7:
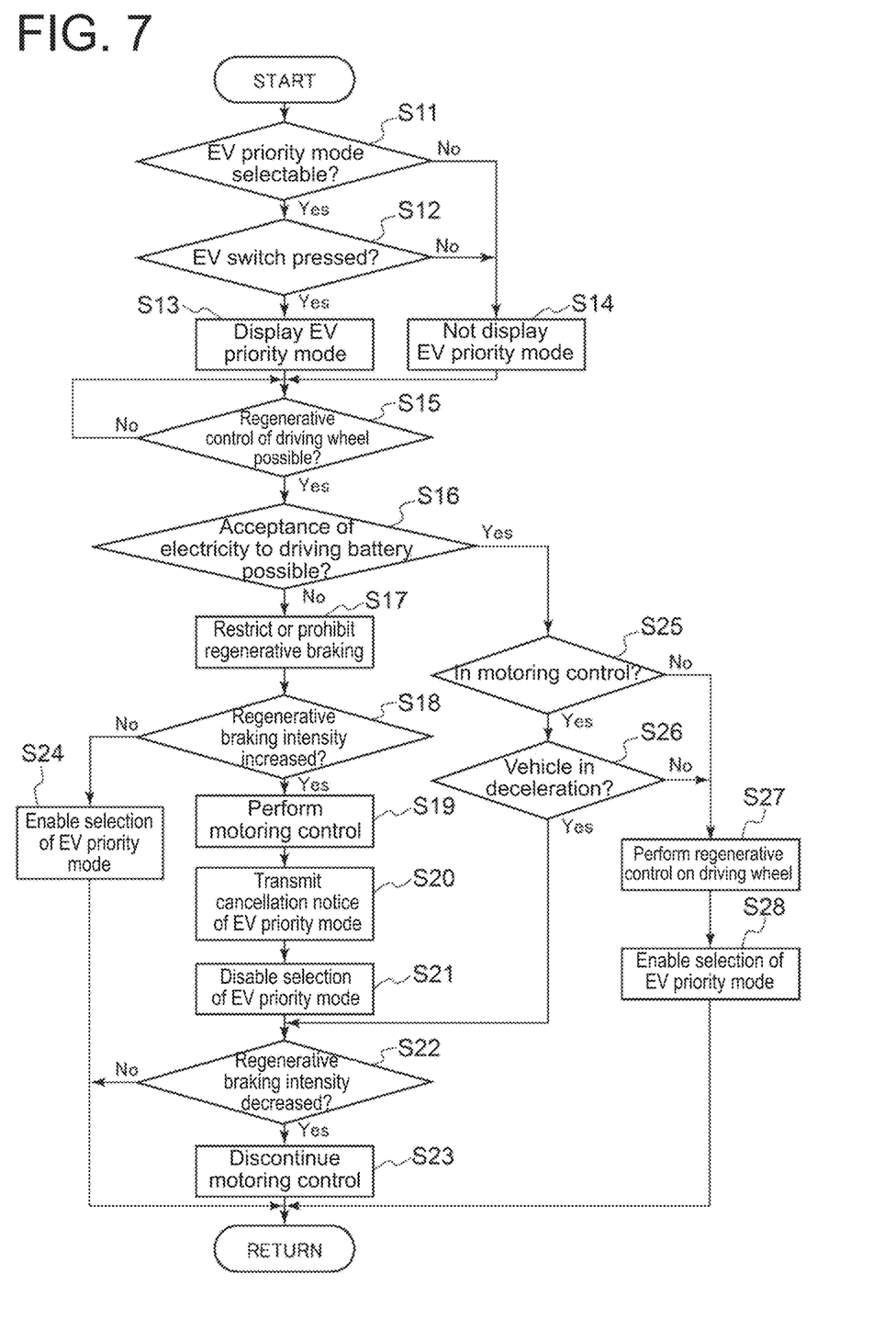
FIG. 7 is a flowchart showing the contents of travel control of the travel control device according to Embodiment 1.

As shown in FIG. 7, in the travel control device 6 for the hybrid vehicle 1 according to Embodiment 1, the EV priority control portion 611 first determines whether the EV priority mode is selectable (step S11). If the EV priority control portion 611 determines that the EV priority mode is selectable (step S11: Yes), the EV priority control portion 611 determines whether the EV switch 79 is pressed (step S12). If the EV priority control portion 611 determines that the EV switch 79 is pressed (step S12: Yes), the EV priority mode is selected and the display control part 65 displays that the mode is in the EV priority mode in the display area 81 of the multi-information display 8 for displaying the EV priority mode (step S13). On the other hand, if the EV priority control portion 611 determines that the EV priority mode is unselectable (step S11: No) or if the EV priority control portion 611 determines that the EV switch 79 is not pressed (step S12: No) even though the EV priority control portion 611 determines that the EV priority mode is selectable (step S11: Yes), the EV priority mode is not selected and the display control part 65 does not display that the mode is in the EV priority mode in the display area 81 of the multi-information display 8 for displaying the EV priority mode (step S14).

Next, the travel control device 6 determines whether regenerative braking on the driving wheel 27 is possible (step S15). Whether regenerative braking on the driving wheel 27 is possible is determined by whether the traveling motor generator 21 is broken, regenerative braking on the driving wheel 27 is impossible if the traveling motor generator 21 is broken, and regenerative braking on the driving wheel 27 is possible if the traveling motor generator 21 is not broken.

If the vehicle is not decelerated (if the vehicle is accelerated) (step S15: No), the acceleration control part 61 controls the traveling motor generator 21 and the power generation motor generator 23 via the power drive unit 3 as well as controls the engine 25 via the engine control unit 4 such that the driving wheel 27 is power-driven based on the depression amount of the accelerator pedal detected by the accelerator pedal sensor 71.

The acceleration control part 61 switches from EV traveling to engine traveling as appropriate by using, for example, the depression amount and depression speed of the accelerator pedal detected by the accelerator pedal, the remaining battery capacity of the driving battery 5, and the vehicle speed as indexes. Then, if the EV priority mode is selected, EV traveling is prioritized over engine traveling as described above.

If the vehicle is decelerated (step S15: Yes), the regenerative control part 63 refers to the determination of whether the battery management unit 59 can accept electricity to the driving battery 5 (step S16). Then, if the battery management unit 59 restricts the acceptance of electricity to the driving battery 5 (step S16: No), the restriction portion 631 controls the power drive unit 3 such that the traveling motor generator 21 restricts or prohibits regenerative braking (step S17).

Next, if the regenerative braking intensity is increased by the operation part 77 (step S18: Yes) in the state where the restriction portion 631 controls the power drive unit 3 such that the traveling motor generator 21 restricts or prohibits regenerative braking on the driving wheel 27, the acceleration control part 61 deselects the EV priority mode and the forced regeneration portion 633 performs the motoring control (step S19). In Embodiment 1, the forced regeneration portion 633 controls the engine control unit 4 such that the engine 25 is subjected to the combustion operation simultaneously with the motoring control.

Then, the forced regeneration portion 633 transmits the cancellation notice of the EV priority mode to the acceleration control part 611 (step S20). Whereby, the EV priority control portion 611 cancels the EV priority mode by receiving the cancellation notice of the EV priority mode, and the display control part 65 erases the display in the area of the multi-information display 8 for displaying the EV priority mode to disable the selection of the EV priority mode (step S21).

Next, if the regenerative braking intensity is decreased by the operation part 77 (step S22: Yes) in the state where the motoring control is performed, the forced regeneration portion 633 discontinues the motoring control (step S23). In Embodiment 1, the forced regeneration portion 633 controls the engine control unit 4 such that the combustion operation of the engine 25 is discontinued simultaneously with the discontinuation of the motoring control. Whereby, the power drive unit 3 is controlled such that the restriction portion 631 restricts or prohibits regenerative braking of the traveling motor generator 21, if engine noise is cut off and the foot is released from the accelerator pedal. If the regenerative braking intensity is not decreased by the operation part 77 (step S22: No) in the state where the motoring control is performed, the forced regeneration portion 633 continues the motoring control without discontinuing the motoring control. In Embodiment 1, the forced regeneration portion 633 controls the engine control unit 4 such that the motoring control is continued as well as the combustion operation of the engine 25 is continued.

On the other hand, if the regenerative braking intensity is not increased by the operation part 77 (step S18: No) in step 18, the restriction portion 631 continues the state where the power drive unit 3 is controlled such that the traveling motor generator 21 restricts or prohibits regenerative braking and enables the selection of the EV priority mode (Step S24).

Further, if the battery management unit 59 does not restrict the acceptance of electricity to the driving battery 5 (step S16: Yes) in step S16, the regenerative control part 63 controls the power drive unit 3 such that the traveling motor generator 21 performs regenerative braking on the driving wheel 27 at the regeneration level (regenerative braking intensity) set by the operation part 77 (step S27) to enable the selection of the EV priority mode (step S28), on conditions that the motoring control is not performed (step S25: No) and the vehicle is not in deceleration (step S26: No).

Thereafter, by repeating these steps, the travel control device 6 for the hybrid vehicle 1 power-drives the driving wheel 27 of the vehicle and performs regenerative braking on the driving wheel 27 of the vehicle.

Therefore, if the acceptance of electricity to the driving battery 5 is restricted (step S16: No) and the restriction on accepting electricity to the driving battery 5 is lifted (step S19: Yes) when the forced regeneration portion 633 performs the motoring control (step S19), the forced regeneration continuation portion 635 discontinues the motoring control (step S27) on the condition the vehicle is not in deceleration (the vehicle is in acceleration) (step S26: No). Whereby, the regenerative control part 63 controls the power drive unit 3 such that the traveling motor generator 21 performs regenerative braking on the driving wheel 27 at the regenerative braking intensity set by the operation part 77, if engine noise is cut off and the foot is released from the accelerator pedal.

On the other hand, even if the acceptance of electricity to the driving battery 5 is restricted (step S16: No) and the restriction on accepting electricity to the driving battery 5 is lifted (step S16: Yes) when the forced regeneration portion 633 performs the motoring control (step S19: Yes), the forced regeneration continuation portion 635 continues the motoring control during vehicle deceleration (step S26: Yes). Further, in Embodiment 1, the forced regeneration portion 633 controls the engine control unit 4 such that the motoring control is continued as well as the combustion operation of the engine 25 is continued.

With the travel control device 6 for the hybrid vehicle 1 according to Embodiment 1 described above, the acceleration control part 61 deselects the EV priority mode if the regenerative braking intensity is increased by the operation part 77 in the state where the EV priority mode is selected and the acceptance of electricity to the driving battery 5 is restricted. Therefore, it is possible to avoid the rotational drive of the engine 25 by the power generation motor generator 23 in the state where the EV priority mode is selected.

Further, the acceleration control part 61 disables the selection of the EV priority mode from when the regenerative braking intensity is increased by the operation part 77 to when the restriction on accepting electricity to the driving battery 5 is lifted in the state where the EV priority mode is selected and the acceptance of electricity to the driving battery 5 is restricted. Therefore, it is possible to maintain the state where the EV priority mode is canceled, from when the regenerative braking intensity is increased by the operation part 77 to when the driving battery 5 lifts the restriction on accepting electricity to the driving battery 5.

Furthermore, the motoring control is continued during vehicle deceleration even if the restriction on accepting electricity to the driving battery 5 is lifted while the motoring control is performed. Therefore, the discontinuation of the motoring control which is not due to a user operation disappears during vehicle deceleration, making it possible to suppress the risk of giving the user a strong feeling of strangeness, such as the possibility that the vehicle is broken.

In the travel control device 6 for the hybrid vehicle 1 according to Embodiment 1 described above, the acceleration control part may select the EV priority mode (automatically return to the EV priority mode), if the driving battery 5 lifts the restriction on accepting electricity to the driving batten 5 after the EV priority mode is deselected. Consequently, there is no need to select the EV priority mode again by the EV switch 79, even if the rotational drive of the power generation motor generator 23 is started by electricity generated in the traveling motor generator 21 and the EV priority mode is deselected in the case where the EV priority mode is selected by the EV switch 79.

Embodiment 2

The configuration of the hybrid vehicle 1 according to Embodiment 2 is not different from that of the hybrid vehicle 1 according to Embodiment 1, so the description is omitted.
[Configuration of Travel Control Device 6 for Hybrid Vehicle 1]

The configuration of the travel control device 6 for the hybrid vehicle 1 according to Embodiment 2 is not different except for some configurations of the acceleration control part 61 and some configurations of the display control part 65, so only different configurations will be described and descriptions of the same configurations will be omitted.

In the travel control device 6 for the hybrid vehicle 1 according to Embodiment 2, the acceleration control part 61 selects the EV priority mode if the driving battery 5 lifts the restriction on accepting electricity to the driving battery 5 even though the rotational drive of the power generation motor generator 23 is started by electricity generated in the traveling motor generator in the state where the EV priority mode is selected and the EV priority mode is deselected. In other words, the acceleration control part 61 selects the EV priority mode (returns to the EV priority mode), if the driving battery 5 lifts the restriction on accepting electricity to the driving battery 5 after the EV priority mode is deselected.

In the travel control device 6 for the hybrid vehicle 1 according to Embodiment 2, the display control part 65 displays that the EV priority mode is selected in the display area 81 of the multi-information display 8 for displaying that the EV priority mode is selected, if the EV priority mode is selected by the EV switch 79. On the other hand, the display control part 65 erases the display that the EV priority mode is selected from the display area 81 of the multi-information display 8, if the EV priority mode is deselected by the EV switch 79. Whereby, if the EV priority mode is selected by the EV switch 79, the display area 81 of the multi-information display 8 displays that EV priority mode is selected until the EV priority mode is canceled by the EV switch 79.

Further, in the travel control device 6 for the hybrid vehicle 1 according to Embodiment 2, the engine 25 may be started even if the display area 81 of the multi-information display 8 displays that the EV priority mode is selected. In such a case, since the feeling of strangeness may be given to the user driving the hybrid vehicle 1, the display control part 65 may displays that the engine 25 is started on the multi-information display 8 if the engine 25 is started.

For example, the display control part 65 may display on the multi-information display 8 that the EV priority mode is selected (the mode automatically returns to the EV priority mode) after the driving battery 5 lifts the restriction on accepting electricity to the driving battery 5, from when the EV priority mode is canceled (the cancellation notice of the EV priority mode is received) to when the restriction on accepting electricity is lifted. Whereby, the user driving the hybrid vehicle 1 can know that the EV priority mode is selected, i.e. that the mode automatically returns to the EV priority mode if the driving battery 5 lifts the restriction on accepting electricity to the driving battery 5.
[Contents of Travel Control of Hybrid Vehicle 1]

Figure 8:
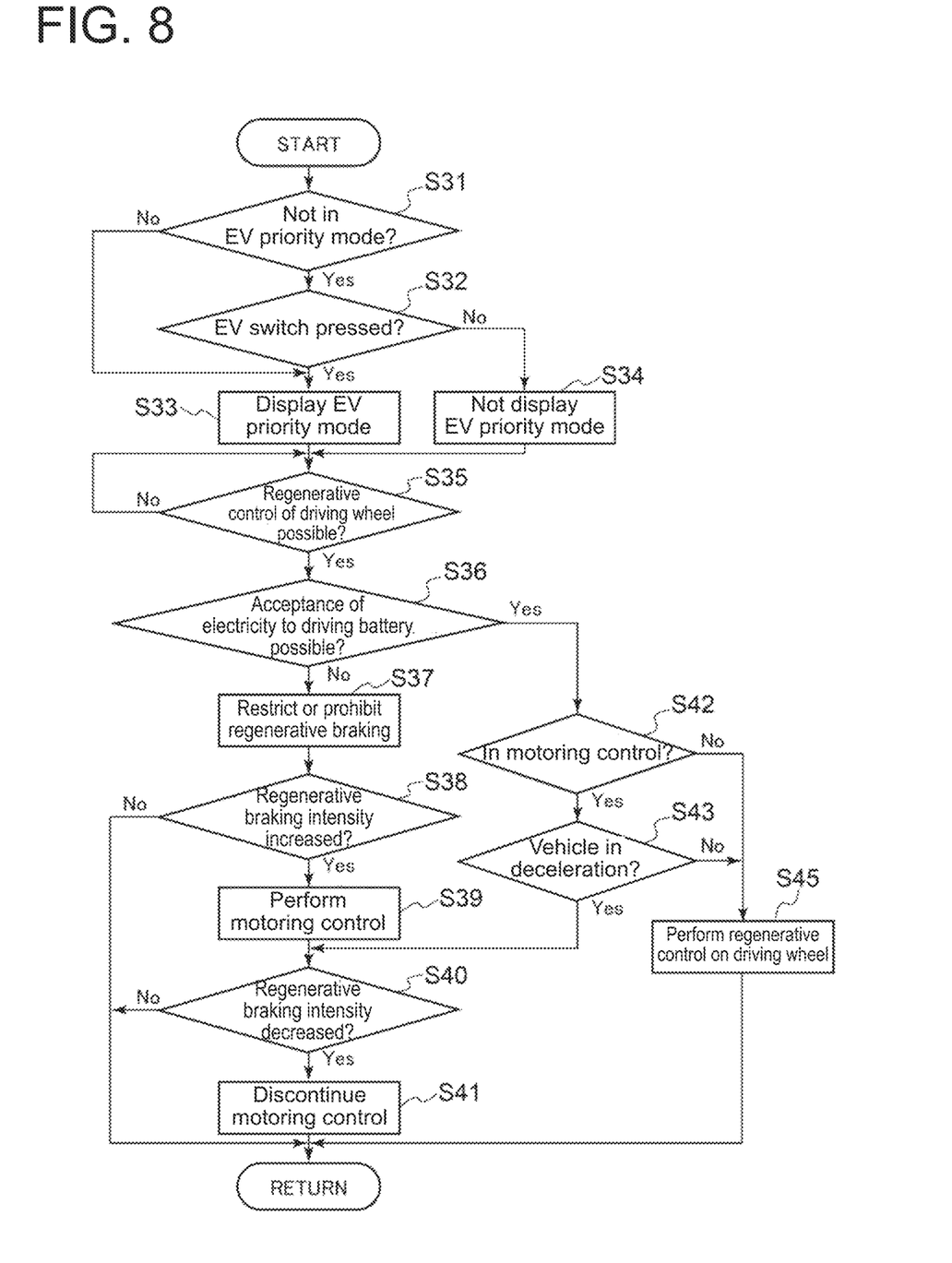
FIG. 8 is a flowchart, showing the contents of travel control of the travel control device according to Embodiment 2.

As shown in FIG. 8, in the travel control device 6 for the hybrid vehicle 1 according to Embodiment 2, the EV priority control portion 611 first determines whether the mode is in the EV priority mode (step S31). If the EV priority control portion 611 determines that the mode is not in the EV priority mode (step S31: Yes), the EV priority control portion 611 determines whether the EV switch 79 is pressed (step S32). If the EV priority control portion 611 determines that the EV switch 79 is pressed (step S32: Yes), the EV priority mode is selected and the display control part 65 displays that the mode is in the EV priority mode in the display area 81 of the multi-information display 8 for displaying the EV priority mode (step S33). On the other hand, if the EV priority control portion 611 determines that the EV switch 79 is not pressed (step S32: No), the EV priority mode is not selected and the display control part 65 does not display that the mode is in the EV priority mode in the display area 81 of the multi-information display 8 for displaying the EV priority mode (step S34). Further, if the EV priority control portion 611 determines that the mode is in the EV priority mode (step S31: No) in step S31, the display control part 65 displays that the mode is in the EV priority mode in the display area 81 of the multi-information display 8 for displaying the EV priority mode (step S33).

Next, the travel control device 6 determines whether regenerative braking on the riving wheel 27 is possible (step S35). Whether regenerative braking on the driving wheel 27 is possible is determined by whether the vehicle is decelerated, regenerative braking on the driving wheel 27 is impossible if the vehicle is not decelerated (if the vehicle is accelerated), and regenerative braking on the driving wheel 27 is possible if the vehicle is decelerated.

If the vehicle is not decelerated (if the vehicle is accelerated) (step S35: No), the acceleration control part 61 controls the traveling motor generator 21 and the power veneration motor generator 23 via the power drive unit 3 as well as controls the engine 25 via the engine control unit 4 such that the driving wheel 27 are power-driven based on the depression amount of the accelerator pedal detected by the accelerator pedal sensor 71.

The acceleration control part 61 switches from EV traveling to engine traveling as appropriate by using, for example, the depression amount and depression speed of the accelerator pedal detected by the accelerator pedal, the remaining battery capacity of the driving battery 5, and the vehicle speed as the indexes. Then, if the EV priority mode is selected, EV traveling is prioritized over engine traveling as described above.

If the vehicle is decelerated (step S35: Yes), the regenerative control part 63 refers to the determination of whether the battery management unit 59 can accept electricity to the driving battery 5 (step S36). Then, if the battery management unit 59 restricts the acceptance of electricity to the driving battery 5 (step S36: No), the restriction portion 631 controls the power drive unit 3 such that the traveling motor generator 21 restricts or prohibits regenerative braking (step S37).

Next, if the regenerative braking intensity is increased by the operation part 77 (step S38: Yes) in the state where the restriction portion 631 controls the power drive unit 3 such that the traveling motor generator 21 restricts or prohibits regenerative braking on the driving wheel 27, the acceleration control part 61 deselects the EV priority mode and the forced regeneration portion 633 performs the motoring control (step S39). In Embodiment 2, the forced regeneration portion 633 controls the engine control unit 4 such that the engine 25 is subjected to the combustion operation simultaneously with the motoring control.

Next, if the regenerative braking intensity is decreased by the operation part 77 (step S40: Yes) in the state where the motoring control is performed, the forced regeneration portion 633 discontinues the motoring control (step S41). In Embodiment 2, the forced regeneration portion 633 controls the engine control unit 4 such that the combustion operation of the engine 25 is discontinued simultaneously with the discontinuation of the motoring control. Whereby, the power drive unit 3 is controlled such that the restriction portion 631 restricts or prohibits regenerative braking of the traveling motor generator 21, if engine noise is cut off and the foot is released from the accelerator pedal. If the regenerative braking intensity is not decreased by the operation part 77 (step S40: No) in the state where the motoring control is performed, the forced regeneration portion 633 continues the motoring control without discontinuing the motoring control. In Embodiment 2, the forced regeneration portion 633 controls the engine control unit 4 such that the motoring control is continued as well as the combustion operation of the engine 25 is continued.

On the other hand, if the regenerative braking intensity is not increased by the operation part 77 in step 38, the restriction portion 631 continues the state where the power drive unit 3 is controlled such that the traveling motor generator 21 restricts or prohibits regenerative braking.

Further, if the battery management unit 59 does not restrict the acceptance of electricity to the driving battery 5 (step S36: Yes) in step S36, the regenerative control part 63 controls the power drive unit 3 such that the traveling motor generator 21 performs regenerative braking on the driving wheel 27 at the regeneration level (regenerative braking intensity) set by the operation part 77 (step S45), on conditions that the motoring control is not performed (step S42: No) and the vehicle is not in deceleration (step S43: No).

Thereafter, by repeating these steps, the travel control device 6 for the hybrid vehicle 1 power-drives the driving wheel 27 of the vehicle and performs regenerative braking on the driving wheel 27 of the vehicle.

Therefore, if the acceptance of electricity to the driving battery 5 is restricted (step S36: No) and the restriction on accepting electricity to the driving battery 5 is lifted (step S36: Yes) when the forced regeneration portion 633 performs the motoring control (step S39), the forced regeneration continuation portion 635 discontinues the motoring control (step S45) on a condition the vehicle is not in deceleration (the vehicle is in acceleration) (step S43: No). Whereby, the regenerative control part 63 controls the power drive unit 3 such that the traveling motor generator 21 performs regenerative braking on the driving wheel 27 at the regenerative braking intensity set by the operation part 77, if engine noise is cut off and the foot is released from the accelerator pedal.

On the other hand, even if the acceptance of electricity to the driving battery 5 is restricted (step S36: No) and the restriction on accepting electricity to the driving battery 5 is lifted when the forced regeneration portion 633 performs the motoring control (step S39), the forced regeneration continuation portion 635 continues the motoring control during vehicle deceleration (step S43: Yes). Further, in Embodiment 2, the forced regeneration portion 633 controls the engine control unit 4 such that the motoring control is continued as well as the combustion operation of the engine 25 is continued.

With the travel control device 6 for the hybrid vehicle 1 according to Embodiment 2 described above, the mode returns to the EV priority mode by causing the driving battery 5 to lift the restriction on accepting electricity to the driving battery 5 even if the rotational drive of the power generation motor generator 23 is started by electricity generated in the traveling motor generator 21 and the EV priority mode is deselected. Consequently, there is no need to select the EV priority mode again by the EV switch 79, even if the rotational drive of the power generation motor generator 23 is started by electricity generated in the traveling motor generator 21 and the EV priority mode is deselected in the case where the EV priority mode is selected by the EV switch 79.

Further, the motoring control is continued during vehicle deceleration even if the restriction on accepting electricity to the driving battery 5 is lifted while the motoring control is performed. Therefore, the discontinuation of the motoring control which is not due to the user operation disappears during vehicle deceleration, making it possible to suppress the risk of giving the user the strong feeling of strangeness, such as the possibility that the vehicle is broken.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

[1] A travel control device (6) for a hybrid vehicle (1) according to an aspect, includes: a traveling motor generator (21) configured to power-drive a driving wheel (27) of the vehicle and configured to perform regenerative braking on the driving wheel (27); a driving battery (5) configured to supply electricity to the traveling motor generator (21) if the traveling motor generator (21) power-drives the driving wheel (27) and configured to recover electricity from the traveling motor generator (21) if the traveling motor generator (21) performs regenerative braking on the driving wheel (27); a power generation motor generator (23) configured to generate electricity to charge the driving battery (5); and an engine (25) configured to rotationally drive the power generation motor generator (23) and be rotationally driven by the power generation motor generator (23). The hybrid vehicle (1) includes: an EV switch (7)) for selecting an EV priority mode; and an operation part (77) for setting a regenerative braking intensity of the traveling motor generator (21), The travel control device (6) includes: an acceleration control part (61) configured to control rotational drive of the traveling motor generator (21) or rotational drive of the engine (25) such that the driving wheel (27) is power-driven based on a depression amount of an accelerator pedal; and a regenerative control part (63) configured to control the traveling motor generator (21) such that the traveling motor generator (21) performs regenerative braking on the driving wheel (27) with the regenerative control intensity set by the operation part (77). The acceleration control part (61) includes: an EV priority control portion (611) configured to prioritize EV traveling where the rotational drive of the engine (25) is stopped over engine traveling where the engine (25) is rotationally driven, if the EV priority mode is selected. The regenerative control part (63) includes: a restriction portion (631) configured to control the traveling motor generator (21) such that the regenerative braking is restricted or prohibited, if the driving battery (5) restricts acceptance of electricity to the driving battery (5); and a forced regeneration portion (633) configured to control the traveling motor generator (21) such that the traveling motor generator (21) performs regenerative braking on the driving wheel (27) and configured to rotationally drive the engine by electricity generated in the traveling motor generator (21) to consume electricity, if the regenerative braking intensity is increased by the operation part (77) in a state where the restriction portion (631) controls the traveling motor generator (21) such that the regenerative braking is restricted or prohibited. The acceleration control part (61) deselects the EV priority mode if the regenerative braking intensity is increased by the operation part (77) in a state where the EV priority mode is selected and the acceptance of electricity to the driving battery (7) is restricted.

With such configuration, the acceleration control part (61) deselects the EV priority mode if the regenerative braking intensity is increased by the operation part (77) in the state where the EV priority mode is selected and the acceptance of electricity to the driving battery (7) is restricted. Therefore, it is possible to avoid the rotational drive of the engine (25) by the power generation motor generator (23) in the state where the EV priority mode is selected.

[2] A travel control device (6) for a hybrid vehicle (1) according to another aspect is the travel control device (6) for the hybrid vehicle (1) as defined in [1] wherein the forced regeneration portion (633) transmits a cancellation notice of the EV priority mode to the acceleration control part (61) if the regenerative braking intensity is increased by the operation part (77), and wherein the acceleration control part (61) disables selection of the EV priority mode from when the cancellation notice of the EV priority mode is received to when the driving battery (5) lifts the restriction on accepting electricity to the driving battery (5).

With such configuration, the acceleration control part (61) disables the selection of the EV priority mode from when the regenerative braking intensity is increased by the operation part (77) to when the driving battery (5) lifts the restriction on accepting electricity to the driving battery (5). Whereby, it is possible to maintain the state where the EV priority mode is canceled, from when the regenerative braking intensity is increased by the operation part (77) to when the driving battery (5) lifts the restriction on accepting electricity to the driving battery (5).

[3] A travel control device (6) for a hybrid vehicle (1) according to another aspect is the travel control device (6) for the hybrid vehicle (1) as defined in [1] or [2], wherein the acceleration control part (61) selects the EV priority mode, if the driving battery (5) lifts the restriction on accepting electricity to the driving battery (5) after the EV priority mode is deselected.

With such configuration, the mode returns to the EV priority mode by causing the driving battery (5) to lift the restriction on accepting electricity to the driving battery (5) even if the rotational drive of the power generation motor generator (23) is started by electricity generated in the traveling motor generator (21) and the EV priority mode is deselected. Consequently, there is no need to select the EV priority mode again by the EV switch (79), even if the rotational drive of the power generation motor generator (23) is started by electricity generated in the traveling motor generator (21) and the EV priority mode is deselected in the case where the EV priority mode is selected by the EV switch (79).

[4] A travel control device (6) for a hybrid vehicle (1) according to another aspect is the travel control device (6) for the hybrid vehicle (1) as defined in [2], wherein the hybrid vehicle (1) includes an indicator (the display area 81 of the multi-information display 8) for displaying that the EV priority mode is selected by the EV switch (79), and wherein the indicator (the display area 81 of the multi-information display 8) displays that the EV priority mode is unselectable, if the EV switch (79) is operated, from when the cancellation notice of the EV priority mode is received to when the driving battery (5) lifts the restriction on accepting electricity to the driving battery (5).

With such configuration, the user driving the hybrid vehicle (1) can know that the EV priority mode is unselectable from when the EV priority mode is canceled to when the driving battery (5) lifts the restriction on accepting electricity to the driving battery (5).

[5] A travel control device (6) for a hybrid vehicle (1) according to another aspect is the travel control device (6) for the hybrid vehicle (1) as defined in [2], wherein the hybrid vehicle (1) includes an indicator (the display area 81 of the multi-information display 8) for displaying that the EV priority mode is selected if the EV priority mode is selected, and wherein the indicator (the display area 81 of the multi-information display 8) displays that the EV priority mode is selected after the driving battery (5) lifts the restriction on accepting electricity to the driving battery (5), from when the cancellation notice of the EV priority mode is received to when the restriction is lifted.

With such configuration, the user driving the hybrid vehicle (1) can know that the EV priority mode is selected if the driving battery (5) lifts the restriction on accepting electricity to the driving battery (5).

[6] A travel control device 6) for a hybrid vehicle (1) according to an aspect is the travel control device (6) for the hybrid vehicle (1) as defined in any one of [1] to [5], including: a forced regeneration continuation portion (635) configured to continue a control to rotationally drive the power generation motor generator (23) by electricity generated in the traveling motor generator (21), during deceleration of the hybrid vehicle (1), even if the restriction on accepting electricity to the driving battery (5) is lifted when the forced regeneration portion (633) controls the traveling motor generator (21) such that the traveling motor generator (21) performs regenerative braking on the driving wheel (27).

With such configuration, the forced regeneration continuation portion (635) continues the control to rotationally drive the power generation motor generator (23) by electricity generated in the traveling motor generator (21), during deceleration of the hybrid vehicle (1), even if the restriction on accepting electricity to the driving battery (5) is lifted when the forced regeneration portion (633) controls the traveling motor generator (21) such that the traveling motor generator (21) performs regenerative braking on the driving wheel (27). Whereby, the state is continued where the engine (225) is rotationally driven even if the restriction on accepting electricity to the driving battery (5) is lifted during deceleration of the hybrid vehicle (1). Therefore, the stop of the engine which is not due to a user operation disappears during vehicle deceleration, making it possible to suppress the risk of giving the user a strong feeling of strangeness, such as the possibility that the vehicle is broken.

REFERENCE SIGNS LIST

1 Hybrid vehicle
21 Traveling motor generator
23 Power generation motor generator
25 Engine
27 Driving wheel
29 Transaxle
291 Clutch
3 Power drive unit (PDU)
4 Engine control unit (ECU)
5 Driving battery
50 Battery pack
51 Battery cell
52 Battery module
53 Current sensor
55 Leakage sensor
57 Cell monitor unit (CMU)
59 Battery management unit (BMU)
6 Travel control device (EVECU)
61 Acceleration control part
611 EV priority control portion
63 Regenerative control part
631 Restriction portion
633 Forced regeneration portion
635 Forced regeneration continuation portion
65 Display control part
71 Accelerator pedal sensor
73 Brake pedal sensor
75 Vehicle speed sensor
77 Operation part
771 Center console
773 Selector lever
775 Steering
777 Regeneration level selector
7771 Negative-side selector
7773 Positive-side selector
79 EV switch
8 Multi-information display (indicator)
81 Display area for displaying EV priority mode
83 Display area for displaying operating state/non-operating state of engine

The invention claimed is:

1. A travel control device for a hybrid vehicle, comprising:
a traveling motor generator configured to power-drive a driving wheel of the vehicle and configured to perform regenerative braking on the driving wheel;
a driving battery configured to supply electricity to the traveling motor generator if the traveling motor generator power-drives the driving wheel and configured to recover electricity from the traveling motor generator if the traveling motor generator performs regenerative braking on the driving wheel;
a power generation motor generator configured to generate electricity to charge the driving battery; and
an engine configured to rotationally drive the power generation motor generator and be rotationally driven by the power generation motor generator,
wherein the hybrid vehicle comprises:
an EV switch for selecting an EV priority mode; and
an operation part for setting a regenerative braking intensity of the traveling motor generator,
wherein the travel control device comprises:
an acceleration control part configured to control rotational drive of the traveling motor generator or rotational drive of the engine such that the driving wheel is power-driven based on a depression amount of an accelerator pedal; and
a regenerative control part configured to control the traveling motor generator such that the traveling motor generator performs regenerative braking on the driving wheel with the regenerative control intensity set by the operation part,
wherein the acceleration control part includes:
an EV priority control portion configured to prioritize EV traveling where the rotational drive of the engine is stopped over engine traveling where the engine is rotationally driven, if the EV priority mode is selected,
wherein the regenerative control part includes:
a restriction portion configured to control the traveling motor generator such that the regenerative braking is restricted or prohibited, if the driving battery restricts acceptance of electricity to the driving battery; and
a forced regeneration portion configured to control the traveling motor generator such that the traveling motor generator performs regenerative braking on the driving wheel and configured to rotationally drive the power generation motor generator by electricity generated in the traveling motor generator to rotationally drive the engine, if the regenerative braking intensity is increased by the operation part in a state where the restriction portion controls the traveling motor generator such that the regenerative braking is restricted or prohibited, and wherein the acceleration control part deselects the EV priority mode if the regenerative braking intensity is increased by the operation part in a state where the EV priority mode is selected and the acceptance of electricity to the driving battery is restricted.

2. The travel control device for the hybrid vehicle according to claim 1, wherein the forced regeneration portion transmits a cancellation notice of the EV priority mode to the acceleration control part if the regenerative braking intensity is increased by the operation part, and wherein the acceleration control part disables selection of the EV priority mode from when the cancellation notice of the EV priority mode is received to when the driving battery lifts the restriction on accepting electricity to the driving battery.

3. The travel control device for the hybrid vehicle according to claim 2, wherein the hybrid vehicle comprises an indicator for displaying that the EV priority mode is selected by the EV switch, and wherein the indicator displays that the EV priority mode is unselectable, if the EV switch is operated, from when the cancellation notice of the EV priority mode is received to when the driving battery lifts the restriction on accepting electricity to the driving battery.

4. The travel control device for the hybrid vehicle according to claim 2, wherein the hybrid vehicle comprises an indicator for displaying that the EV priority mode is selected if the EV priority mode is selected, and wherein the indicator displays that the EV priority mode is selected after the driving battery lifts the restriction on accepting electricity to the driving battery, from when the cancellation notice of the EV priority mode is received to when the restriction is lifted.

5. The travel control device for the hybrid vehicle according to claim 1, wherein the acceleration control part selects the EV priority mode, if the driving battery lifts the restriction on accepting electricity to the driving battery after the EV priority mode is deselected.

6. The travel control device for the hybrid vehicle according to claim 1, comprising:

a forced regeneration continuation portion configured to continue a control to rotationally drive the power generation motor generator by electricity generated in the traveling motor generator, during deceleration of the hybrid vehicle, even if the restriction on accepting electricity to the driving battery is lifted when the forced regeneration portion controls the traveling motor generator such that the traveling motor generator performs regenerative braking on the driving wheel.

* * * * *